United States Patent
Li

(10) Patent No.: US 10,630,637 B2
(45) Date of Patent: Apr. 21, 2020

(54) METHOD FOR ASCERTAINING AN IP ADDRESS AND A MAC ADDRESS OF A UNIT UNDER TEST MOUNTED IN A RACK SERVER

(71) Applicant: MITAC COMPUTING TECHNOLOGY CORPORATION, Taoyuan (TW)

(72) Inventor: Yueh-Ying Li, Hsinchu (TW)

(73) Assignee: Mitac Computing Technology Corporation, Taoyuan (TW)

(*) Notice: Subject to any disclaimer, the term of this patent is extended or adjusted under 35 U.S.C. 154(b) by 281 days.

(21) Appl. No.: 15/810,332

(22) Filed: Nov. 13, 2017

(65) Prior Publication Data

US 2018/0212924 A1 Jul. 26, 2018

(30) Foreign Application Priority Data

Jan. 25, 2017 (TW) .............................. 106102832 A

(51) Int. Cl.
| | |
|---|---|
| *G06F 9/54* | (2006.01) |
| *H04L 29/12* | (2006.01) |
| *G06F 9/4401* | (2018.01) |
| *G06F 11/22* | (2006.01) |
| *G06F 11/36* | (2006.01) |

(52) U.S. Cl.
CPC ........ *H04L 61/2015* (2013.01); *G06F 9/4406* (2013.01); *G06F 9/545* (2013.01); *G06F 11/2289* (2013.01); *G06F 11/2294* (2013.01); *G06F 11/36* (2013.01); *H04L 61/103* (2013.01); *H04L 61/6022* (2013.01)

(58) Field of Classification Search
CPC .................... G06F 9/54; G06F 11/22

USPC ......................................................... 709/220
See application file for complete search history.

(56) References Cited

U.S. PATENT DOCUMENTS

| | | | |
|---|---|---|---|
| 2014/0269386 A1* | 9/2014 | Chu ................. | H04L 41/145 370/252 |
| 2017/0339102 A1* | 11/2017 | Chhuor .............. | H04L 61/2015 |

(Continued)

FOREIGN PATENT DOCUMENTS

TW             I501090 B      9/2015

OTHER PUBLICATIONS

Search Report appended to an Office Action, which was issued to Taiwanese counterpart application No. 106102832 by the TIPO dated Mar. 23, 2018, with an English translation thereof (2 pages, English translation included).

*Primary Examiner* — Vivek Srivastava
*Assistant Examiner* — Sibte H Bukhari
(74) *Attorney, Agent, or Firm* — Michael Best & Friedrich LLP

(57) ABSTRACT

A method for ascertaining an IP address and a MAC address of a unit under test (UUT) mounted in a rack server includes: assigning and providing an IP address to the UUT when receiving a request for an IP address which includes the MAC address of the UUT; storing the IP address thus assigned and the MAC address as a set in a mapping table; transmitting boot configuration data to the UUT when receiving a request for boot-up; determining whether the UUT is running an operating system; and designating the IP address thus assigned which corresponds to the MAC address in the mapping table as a static IP address when it is determined that the UUT is running the operating system.

9 Claims, 2 Drawing Sheets

(56) References Cited

U.S. PATENT DOCUMENTS

2018/0145955 A1\* 5/2018 Nirwal ................. H04L 9/0894
2018/0189424 A1\* 7/2018 Boesch ................ G06F 17/505

\* cited by examiner

METHOD FOR ASCERTAINING AN IP ADDRESS AND A MAC ADDRESS OF A UNIT UNDER TEST MOUNTED IN A RACK SERVER

CROSS-REFERENCE TO RELATED APPLICATION

This application claims priority to Taiwanese Invention Patent Application No. 106102832, filed on Jan. 25, 2017.

FIELD

The disclosure relates to a method for ascertaining an Internet Protocol (IP) address and a media access control (MAC) address, and more particularly to a method for ascertaining an IP address and a MAC address of a unit under test mounted in a rack server.

BACKGROUND

In order to implement remote operation of a server computer mounted in a rack server, or to test any unit under test (UUT) mounted in the rack server, a media access control (MAC) address and an Internet Protocol (IP) address of the server computer or the UUT need to be obtained in advance. However, installation and maintenance of UUTs mounted in a rack server are usually carried out by a manufacturer. A tester, who is responsible for testing the UUTs and is not the original manufacturer, may not know how many UUTs and which types of the UUTs are actually mounted in the rack server, not to mention the MAC addresses and/or IP addresses of the UUTs.

In some cases, the tester has to remove each of the UUTs from the rack server, to look into each of the UUTs for a respective MAC address thereof, and to record the MAC addresses corresponding respectively to the UUTs, so as to start test procedures on the UUTs based on the MAC addresses thus recorded and IP addresses thereof. However, it may be time-consuming and cumbersome for the tester to perform the aforementioned steps. Moreover, the UUTs are at the risk of being damaged during the process of removal from the rack server. In other cases, conventional software, such as Network Mapper (NMAP), may be utilized to scan the IP addresses of all the UUTs mounted in the rack server. Nevertheless, since the IP addresses obtained through this approach are not authenticated, correctness of the IP addresses may be deficient.

SUMMARY

Therefore, an object of the disclosure is to provide a method for ascertaining an Internet Protocol (IP) address and a media access control (MAC) address of a unit under test mounted in a rack server. The method can alleviate at least one of the drawbacks of the prior art.

According to the disclosure, the method for ascertaining an IP address and a MAC address of a unit under test mounted in a rack server is to be implemented by a testing server which is electrically connected to the rack server and is communicable with the unit under test. The method includes the following steps:

A) assigning an IP address to the unit under test when the testing server receives from the unit under test a request for an IP address which includes the MAC address of the unit under test, and providing to the unit under test the IP address thus assigned;

B) storing the IP address thus assigned and the MAC address as a set in a mapping table;

C) transmitting boot configuration data associated with boot-up of the unit under test to the unit under test when the testing server receives a request for boot-up from the unit under test;

D) determining whether the unit under test is running an operating system; and

E) designating the IP address thus assigned which corresponds to the MAC address in the mapping table as a static IP address when it is determined that the unit under test is running the operating system.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
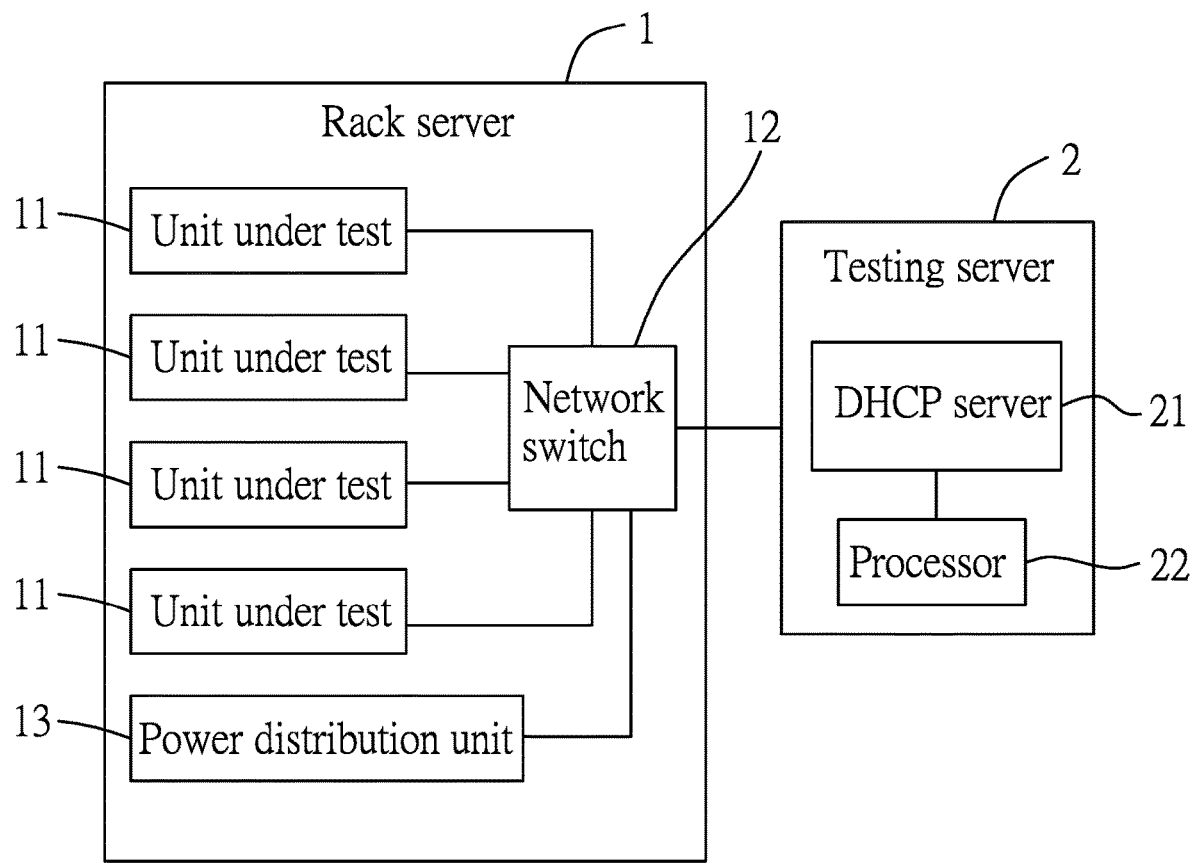
FIG. 1 is a block diagram illustrating an embodiment of a testing server and a rack server according to the disclosure.

Referring to FIG. 1, an embodiment of a testing server 2 is used to implement a method for ascertaining an Internet Protocol (IP) address and a media access control (MAC) address of a unit under test (UUT) mounted in a rack server 1 according to the disclosure. The testing server 2 is electrically connected to the rack server 1 which is mounted with a plurality of units under test (UUTs) 11, a network switch 12, and a power distribution unit 13 that is configured to control power supply to the UUTs 11, and that is electrically connected to the network switch 12 and each of the UUTs 11. The UUTs 11 may be implemented by server computers, baseboard management control (BMC) systems, or any electronic component which is generally mounted in a rack server 1. The power distribution unit 13 may be implemented by a power distribution board (PDB).

The testing server 2 is electrically connected to the network switch 12 via which the testing server 2 is communicable with the UUTs 11. The testing server 2 includes a Dynamic Host Configuration Protocol (DHCP) server 21, and a processor 22 which executes instructions of a software program to implement the method according to the disclosure.

Figure 2:
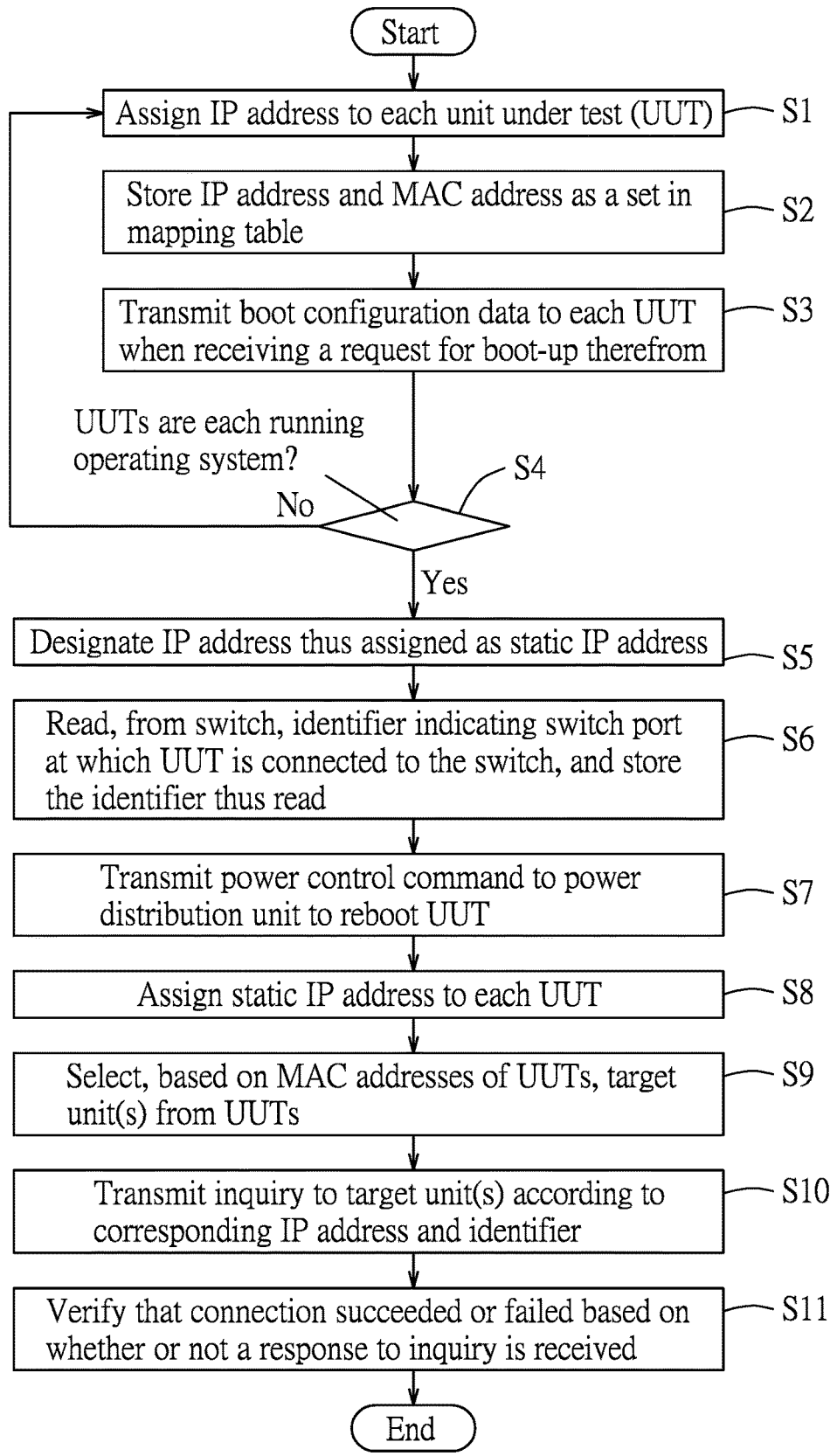
FIG. 2 is a flow chart illustrating an embodiment of a method for ascertaining an IP address and a MAC address of a unit under test mounted in a rack server according to the disclosure.

Referring to FIGS. 1 and 2, an embodiment of a method for ascertaining an IP address and a MAC address of a UUT according to the disclosure includes the following steps.

In step S1, for each of the UUTs 11, the testing server 2 assigns an IP address to the UUT 11 when the testing server 2 receives a request for an IP address which includes the MAC address of the UUT 11 from the UUT 11, and then the testing server 2 provides the IP address, which has been assigned to the UUT 11, to the UUT 11.

In step S2, for each of the UUTs 11, the testing server 2 stores the IP address, which has been assigned to the UUT 11, and the MAC address of the UUT 11 as a set in a mapping table.

In step S3, for each of the UUTs 11, the testing server 2 transmits boot configuration data associated with boot-up of the UUT 11 to the UUT 11 when the testing server 2 receives a request for boot-up from the UUT 11. In this embodiment, the boot configuration data contains a boot loader and a kernel file. Specifically speaking, each of the UUTs 11 is a preboot execution environment (PXE) enabled client, and the testing server 2 is PXE-compatible and supports network protocols, such as DHCP and Trivial File Transfer Protocol (TFTP). The testing server 2 is configured to provide the boot loader and the kernel file through the TFTP service to one of the UUTs 11 from which the request for boot-up is received. Subsequently, said one of the UUT 11 executes the boot loader to load the kernel file for proceeding to a boot-up process. In other words, step S3 is associated with network booting of each of the UUTs 11 by means of PXE.

In step S4, the testing server 2 determines whether the UUTs 11 are each running an operating system. Specifically speaking, for each of the UUTs 11, the testing server 2 detects a connection state of a communication port corresponding to the UUT 11 based on a network mapping technology, such as by utilizing a network mapper (Nmap), so as to determine whether the UUT 11 is running an operating system. In this embodiment, the communication port corresponding to the UUT 11 is a software port for communication, and includes a Secure Shell (SSH) communication port. SSH is capable of providing secure communication and a secure operation environment in an operating system shell of a computer. By using SSH protocols, data to be transmitted may be encrypted to improve transmission security, and information leakage during a process of remote management may be mitigated.

When it is determined by the testing server 2 in step S4 that each individual one of the UUTs 11 is running an operating system, that is, the connection states of the communication ports corresponding respectively to the UUTs 11 are all detected as connected, step S5 is performed. Otherwise, when it is determined by the testing server 2 in step S4 that at least one of the UUTs 11 is not running an operating system, a flow of this method goes back to step S1.

It is worth noting that, when a tester is running tests on the UUTs 11 mounted in the rack server 1, all of the UUTs 11 should be tested simultaneously. Therefore, during a testing process, the IP address and the MAC address of each of the UUTs 11 should be known and each of the UUTs 11 should be running the operating system. As a result, if at least one of the UUTs 11 is not running the operating system, the testing process cannot proceed, and the flow goes back to step S1. That is to say, the flow proceeds to step S5 only when it is determined by the testing server 2 that all of the UUTs 11, which have sent the requests for boot-up, are already running the operating system.

In step S5, the testing server 2 designates each of the IP addresses which has been assigned (referred to as an IP address thus assigned hereinafter) to a respective one of the UUTs 11 and which corresponds to a respective one of the MAC addresses in the mapping table as a static IP address. Specifically speaking, the testing server 2 stores each set of the IP address thus assigned and the MAC address which is stored in the mapping table in a static IP address table containing a DHCP configuration file, so as to designate each of the IP addresses thus assigned as the respective static IP address.

In step S6, for each of the UUTs 11, the testing server 2 reads an identifier that indicates a switch port of the network switch 12, at which the UUT 11 is connected to the network switch 12 and to which the MAC address of the UUT 11 corresponds, from the network switch 12. Subsequently, the testing server 2 stores the identifier thus read into the corresponding set of the IP address thus assigned and the MAC address in the mapping table. It should be noted that the switch port is a physical computer port. In a conventional approach, the MAC addresses for the respective UUTs 11 are determined by using specific software, and the MAC addresses and the switch ports at which the UUTs 11 are respectively connected to the network switch 12 are matched manually so as to obtain correspondence relationships between the MAC addresses and the switch ports. However, in this embodiment, the processor 22 executes the scripted instructions of the software program to configure the testing server 2 to automatically read, from the switch port 12, the identifiers of the switch ports to which the MAC addresses of the UUTs 11 respectively correspond. In this way, automation of obtaining the correspondence relationships and storing information regarding the correspondence relationships into the mapping table may be achieved.

In step S7, the testing server 2 transmits a power control command to the power distribution unit 13 via the network switch 12. The power control command is associated with power supply to the UUTs 11, and the power control command is transmitted for the purpose of rebooting the UUTs 11 mounted in the rack server 1. The power distribution unit 13, according to the power control command, first stops power supply to the UUTs 11 so as to shut the UUTs down, and then restores power supply thereto so as to reboot the UUTs 11 mounted in the rack server 1. After each of the UUTs 11 has been rebooted, step S8 is performed.

In step S8, for each of the UUTs 11, when the testing server 2 receives, from the UUT 11, a request for an IP address which includes the MAC address of the UUT 11, the testing server 2 assigns according to the static IP address table, the static IP address corresponding to the MAC address to the UUT 11, and provides to the UUT 11 the static IP address thus assigned.

In step S9, the testing server 2 selects, based on the MAC addresses of the UUTs 11 stored in the mapping table, at least one target unit from among the UUTs 11. The at least one target unit belongs to a type of a baseboard management controller (BMC). In this embodiment, the testing server 2 indentifies some of the UUTs 11 as belonging to the type of a BMC based on the MAC addresses of the UUTs 11, and said some of the UUTs 11 thus identified serve as the target units.

The approach to identifying which one(s) of the UUTs 11 belongs to the type of a BMC is explained hereinafter. Conventionally, when a server computer and a BMC which is coupled to the specific server computer are manufactured, two MAC addresses are respectively assigned to the server computer and the BMC by the manufacturer of the server computer and the BMC. The MAC address assigned to the BMC has a portion of digits identical to that of the MAC address assigned to the server computer, and the MAC address of the BMC has a value in hexadecimal greater than that of the MAC address of the server computer. For example, in a case that the MAC address of the server computer is 01-02-5e-00-00-01 and the MAC address of the BMC coupled to the specific server computer is 01-02-5e-00-00-02, the first three octets of the MAC addresses are identical, and the MAC address of the BMC has a value in hexadecimal greater than that of the MAC address of the server computer. In this way, the testing server 2, based on the MAC addresses of the UUTs 11, is able to identify, from two of the UUTs 11 whose MAC addresses are partially identical, one of the two UUTs 11 whose MAC address has a value in hexadecimal greater than that of the MAC address of the other one of the two UUTs 11 as belonging to the type of a BMC.

In step S10, the testing server 2 transmits inquiries to the target units, respectively, according to corresponding ones of the IP addresses assigned to the target units and according to corresponding ones of the identifiers indicating the switch ports at which the target units are connected to the network switch 12. Each of the inquiries transmitted to the respective one of the target units includes an Intelligent Platform Management Interface (IPMI) command.

In step S11, for each of the target units, the testing server 2 verifies that a connection to the target unit succeeded when the testing server 2 receives a response to the inquiry from the target unit, and verifies that the connection to the target unit failed when the testing server 2 does not receive a response to the inquiry from the target unit.

To sum up, in the method for ascertaining an IP address and a MAC address of a unit under test in this disclosure, the testing server 2 assigns the IP addresses, which correspond respectively to the MAC addresses of the UUTs 11, to the UUTs 11. Furthermore, the testing server 2 designates each of the IP addresses thus assigned, which corresponds to a respective one of the MAC addresses in the mapping table, as a static IP address. In this way, the testing server 2 automatically obtains information regarding the IP address and the MAC address of each of the UUTs. Moreover, the testing server 2 transmits inquiries to the target units, which belong to the type of a BMC, respectively. Subsequently, when the testing server 2 receives a response to the inquiry from the one of the target units, the testing server 2 is able to verify that a connection to one of the target units succeeded. As a result, which one(s) of the BMCs is likely malfunctioning may be effectively determined.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for ascertaining an Internet Protocol (IP) address and a media access control (MAC) address of a unit under test mounted in a rack server, the method to be implemented by a testing server which is electrically connected to the rack server and is communicable with the unit under test, the unit under test being electrically connected to a network switch which is mounted in the rack server and via which the testing server is communicable with the unit under test, a power distribution unit being mounted in the rack server for controlling power supply to the unit under test and being electrically connected to the network switch, the method comprising steps of:

A) assigning an IP address to the unit under test when the testing server receives from the unit under test a request for an IP address which includes the MAC address of the unit under test, and providing to the unit under test the IP address thus assigned;

B) storing the IP address thus assigned and the MAC address as a set in a mapping table;

C) transmitting boot configuration data associated with boot-up of the unit under test to the unit under test when the testing server receives a request for boot-up from the unit under test;

D) determining whether the unit under test is running an operating system; and

E) automatically designating the IP address thus assigned which corresponds to the MAC address in the mapping table as a static IP address once it is determined that the unit under test is running the operating system, where the testing server stores the set of the IP address table, so as to designate the IP address thus assigned as the static IP address;

G) transmitting, to the power distribution unit via the network switch, a power control command associated with power supply to the unit under test so as to reboot the unit under test mounted in the rack server; and H) assigning, according to the static IP address table when the testing server receives from the unit under test a request for an IP address which includes the MAC address of the unit under test, the static IP address corresponding to the MAC address to the unit under test, and providing the static IP address to the unit under test.

2. The method as claimed in claim 1, wherein step C) includes transmitting the boot configuration data which contains a boot loader and a kernel file to the unit under test.

3. The method as claimed in claim 1, wherein step D) includes detecting a connection state of a communication port corresponding to the unit under test so as to determine whether the unit under test is running an operating system.

4. The method as claimed in claim 3, wherein step D) includes detecting the connection state of the communication port based on a network mapping technology.

5. The method as claimed in claim 3, the communication port corresponding to the unit under test including a Secure Shell (SSH) communication port, wherein step D) includes detecting the connection state of the SSH communication port.

6. The method as claimed in claim 1, further comprising, subsequent to steps D) and E), a step of:

F) reading from the network switch, when it is determined that the unit under test is running the operating system, an identifier that indicates a switch port of the network switch at which the unit under test is connected to the network switch, and storing in the mapping table the identifier thus read into the set of the IP address thus assigned and the MAC address.

7. The method as claimed in claim 1, there being a plurality of the unit under tests (UUTs), the method further comprising, subsequent to step H), steps of:

I) selecting, based on the MAC addresses of the units under test stored in the mapping table, at least one target unit from among the units under test, the at least one target unit belonging to a type of a baseboard management controller (BMC);

J) transmitting an inquiry to the at least one target unit according to one of the IP addresses assigned to the at least one target unit; and K) verifying that a connection to the at least one target unit succeeded when the testing server receives a response to the inquiry from the at least one target unit.

8. The method as claimed in claim 7, the inquiry transmitted to the at least one target unit includes an Intelligent Platform Management Interface (IPMI) command.

9. The method as claimed in claim 1, the rack server being mounted with a plurality of UUTs, wherein step D) includes:
   determining whether all of the UUTs are already running the operating system so as to ensure that all of the UUTs are going to be tested simultaneously during a subsequent testing process.

\* \* \* \* \*